US 8,524,059 B2

(12) United States Patent
Lee et al.

(10) Patent No.: US 8,524,059 B2
(45) Date of Patent: *Sep. 3, 2013

(54) APPARATUS AND METHOD FOR ADJUSTING PH OF SOLUTION

(75) Inventors: Hun joo Lee, Seoul (KR); Jin tae Kim, Hwaseong-si (KR); Sung-young Jeong, Yongin-si (KR); Joon-ho Kim, Seongnam-si (KR); Hee-kyun Lim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/495,342

(22) Filed: Jun. 13, 2012

(65) Prior Publication Data

US 2012/0255871 A1   Oct. 11, 2012

Related U.S. Application Data

(62) Division of application No. 11/559,924, filed on Nov. 15, 2006, now Pat. No. 8,221,597.

(30) Foreign Application Priority Data

Jan. 5, 2006   (KR) .................. 10-2006-0001395

(51) Int. Cl.
*G01N 27/44* (2006.01)

(52) U.S. Cl.
USPC ................. 204/450; 204/518; 204/524

(58) Field of Classification Search
USPC ........... 204/260, 228.6, 196.12, 193, 194, 204/400, 433, 403.03, 450, 518, 524; 422/99, 422/100, 72, 63, 64; 137/803–842, 601.01–602
See application file for complete search history.

(56) References Cited

U.S. PATENT DOCUMENTS

| | | |
|---|---|---|
| 5,084,148 A | 1/1992 | Kazcur et al. |
| 5,814,205 A | 9/1998 | McAleer et al. |

(Continued)

FOREIGN PATENT DOCUMENTS

| | | | |
|---|---|---|---|
| WO | WO 96/25662 | * | 8/1996 |
| WO | WO9625662 A1 | | 8/1996 |

(Continued)

OTHER PUBLICATIONS

Laritz et al. A microfluidic pH-regulation system based on printed circuit board technology, Sensors and Actuators, 2000, 230-235.*

(Continued)

*Primary Examiner* — Luan Van
*Assistant Examiner* — Gurpreet Kaur
(74) *Attorney, Agent, or Firm* — Cantor Colburn LLP

(57) ABSTRACT

A pH adjusting apparatus includes an electrolytic chip receiving a solution, an electrolytic chip loading station receiving the electrolytic chip, an input unit inputting electrolysis conditions, a control unit receiving the electrolysis conditions and controlling electrolysis performed in the electrolytic chip, and a display unit displaying the electrolysis conditions and a progress of the electrolysis. Thus, the pH of a solution can be adjusted easily and accurately, by precisely controlling a constant current, a constant voltage, and current and voltage application times, thereby enabling useful application in various biological assays such as cell lysis. Furthermore, the pH adjusting apparatus has small size and weight and can be operated for a long time after charging once due to low power consumption.

5 Claims, 17 Drawing Sheets

(56) References Cited

U.S. PATENT DOCUMENTS

| | | |
|---|---|---|
| 6,168,948 B1 | 1/2001 | Anderson et al. |
| 7,947,196 B2 | 5/2011 | Lee et al. |
| 2002/0176804 A1 * | 11/2002 | Strand et al. .................. 422/100 |
| 2005/0047972 A1 | 3/2005 | Lauks et al. |
| 2007/0138025 A1 | 6/2007 | Lee et al. |

FOREIGN PATENT DOCUMENTS

| | | | |
|---|---|---|---|
| WO | WO 98/22813 | * | 5/1998 |
| WO | WO9822813 A1 | | 5/1998 |

OTHER PUBLICATIONS

Laritz, C. et al., "A microfluidic pH-regulation system based on printed circuit board technology", Sensors and Actuators, 2000, pp. 230-235.

Korean Office Action for Korean patent application No. 10-2006-0001395, Non-Final Rejection dated Nov. 22, 2006.

* cited by examiner

APPARATUS AND METHOD FOR ADJUSTING PH OF SOLUTION

CROSS REFERENCE TO RELATED APPLICATIONS

This application is a divisional application of U.S. application Ser. No. 11/559,924 filed Nov. 15, 2006, which claims priority to Korean Patent Application No. 10-2006-0001395, filed on Jan. 5, 2006 and all the benefits accruing therefrom under 35 U.S.C. §119, and the contents of which in its entirety are herein incorporated by reference.

BACKGROUND OF THE INVENTION

1. Field of the Invention

The present invention relates to a pH adjusting apparatus and a method of adjusting the pH of a fluid using the same. More particularly, the present invention relates to a pH adjusting apparatus for adjusting the pH of a solution accurately and easily, and a method of adjusting the pH of a solution using the pH adjusting apparatus.

2. Description of the Related Art

Generally, molecular diagnosis of specific pathogenic species consists of four steps: cell lysis, DNA separation, DNA amplification, and DNA detection.

Efficient extraction of DNAs from cells is needed for many applications and essential for molecular diagnosis, in particular, isolation and quantification of pathogenic species. Generally, molecular diagnosis involves DNA amplification after DNA extraction. Examples of DNA amplification are polymerase chain reaction ("PCR") amplification, ligase chain reaction ("LCR") amplification, stranded-displacement amplification, nucleic acid-based amplification, repair chain reaction ("RCR") amplification, helicase-dependent amplification, Qβ replicase amplification, or ligation activated transcription ("LAT") amplification.

DNA separation from cells is performed using a material capable of binding with DNA. A material that can be used for DNA separation may be silica, glass fiber, an anion exchange resin, or a magnetic bead. Generally, cell lysis can be performed using a mechanical method, a chemical method, a thermal method, an electrical method, an ultrasonic method, or a microwave method.

In various biological assays including molecular diagnosis of specific pathogenic species, individual steps may be performed at different pH values.

Conventionally, pH adjustment in biological assays is achieved by adding or removing a pH-adjusting solution, e.g., an acidic solution, a basic solution, a neutral solution, or a buffer solution, to or from a sample solution. However, the addition or removal of the pH-adjusting solution requires a separate apparatus and process and causes the dilution of the sample solution.

Such an additional process and apparatus for the addition or removal of the pH-adjusting solution may seriously affect micro-volume biological sample assays, and the dilution of the sample solution may adversely affect acquisition or amplification of desired samples. Furthermore, the added pH-adjusting solution may act as an inhibitor in subsequent biological assays. In this case, it is necessary to remove the pH-adjusting solution after use.

In biological assays, an electrolysis method is used as another method for adjusting the pH of a solution. For example, the pH of a solution can be adjusted using $H^+$ and $OH^-$ ions respectively generated from an anode and a cathode by electrolysis of water. In the pH adjustment method using electrolysis, a current difference may be caused by a salt or cell concentration variation between samples or a resistance change due to gas generation. Thus, in the electrolysis method, it is important to constantly maintain a current, since current is the major factor for pH adjustment.

However, a pH adjusting apparatus using constant current electrolysis has not yet been reported. Furthermore, the use of a constant current-generating condenser increases the size and weight of a pH adjusting apparatus, thereby making it difficult to make the apparatus portable.

BRIEF SUMMARY OF THE INVENTION

The present invention provides an apparatus for adjusting the pH of a solution accurately and easily.

The present invention also provides a method of adjusting the pH of a solution using the apparatus.

According to exemplary embodiments of the present invention, there is provided a pH adjusting apparatus including an electrolytic chip which receives a solution whose pH is to be adjusted, an electrolytic chip loading station which receives the electrolytic chip, an input unit which inputs electrolysis conditions, a control unit which receives the electrolysis conditions and controls electrolysis performed in the electrolytic chip, and a display unit which displays the electrolysis conditions and a process of the electrolysis.

The electrolytic chip may include a chamber that receives the solution whose pH is to be adjusted, a cathode disposed at a side of the chamber, and an anode disposed at an opposite side of the chamber. The electrolytic chip may further include an ion-exchange material, and the ion-exchange material may divide the chamber into a cathode chamber including the cathode and an anode chamber including the anode.

The electrolytic chip loading station may include an electrolytic chip support that supports the electrolytic chip, an electrode contact terminal that contacts the cathode and the anode of the electrolytic chip and includes a spring pad, and a cover that covers the loaded electrolytic chip. The electrode contact terminal may be formed on an inside of the cover or on the electrolytic chip support.

The electrolysis conditions may include a current applied to the electrolytic chip, a voltage applied to the electrolytic chip, a current application time, or a voltage application time, and may include a constant current applied to the electrolytic chip and a constant current application time.

The pH adjusting apparatus may further include a voltage measurement unit that measures a voltage applied to the electrolytic chip and transmits measured voltage to the control unit, and a current measurement unit that measures a current applied to the electrolytic chip and transmits measured current to the control unit.

The pH adjusting apparatus may further include an interface connected to a peripheral computer, a memory device that stores information, a power supply unit, and a power control unit that converts an applied power to different powers and supplies the different powers to the electrolytic chip, the control unit, and the display unit.

The input part may include a first button, a second button, and a third button, and pressing the first button may select between a current setting menu, a time setting menu, and a voltage setting menu, pressing the second button may increase a value of current, time, or voltage, and pressing the third button may decrease a value of current, time, or voltage.

The pH adjusting apparatus may be sized to fit within an average adult human hand.

According to other exemplary embodiments of the present invention, a method of adjusting a pH of a solution using the above-described pH adjusting apparatus may include (a) supplying a solution including an ion having a lower or higher standard oxidation potential than water into the anode chamber of the electrolytic chip and supplying a solution including an ion having a lower standard reduction potential than water into the cathode chamber of the electrolytic chip, (b) loading the electrolytic chip on the electrolytic chip loading station, (c) inputting electrolysis conditions; and (d) performing electrolysis in the anode chamber and the cathode chamber by passing a current through the anode and the cathode of the electrolytic chip according to the electrolysis conditions so that the solution supplied into the anode chamber or the solution supplied into the cathode chamber is adjusted to have an adjusted pH at a predetermined pH value.

Supplying the solution into the cathode chamber may include supplying a cell or a virus, and cell or virus lysis may occur at the adjusted pH of the solution. Supplying the solution into the cathode chamber may include supplying one of saliva, urine, blood, serum, and a cell culture.

Inputting the electrolysis conditions may include inputting a current applied to the electrolytic chip, a voltage applied to the electrolytic chip, a current application time, or a voltage application time, and may include inputting a constant current to the electrolytic chip and a constant current application time.

According to still other exemplary embodiments of the present invention, a pH adjusting apparatus includes an electrolytic chip receiving a solution whose pH is to be adjusted, the electrolytic chip including a chamber which receives the solution whose pH is to be adjusted, a cathode disposed at a side of the chamber, an anode disposed at an opposite side of the chamber, and an ion-exchange material dividing the chamber into a cathode chamber having the cathode and an anode chamber having the anode, wherein the cathode and the anode of the electrolytic chip contact a contact terminal of the pH adjusting apparatus and receive current or voltage through the contact terminal.

The anode may be ladder-shaped and the ion-exchange material may be an ion-exchange membrane, and the electrolytic chip may further include an anode support formed between the anode and the ion-exchange membrane and a pillar structure formed between the cathode and the ion-exchange membrane, the pillar structure and the anode supporting the ion-exchange membrane there between.

According to the pH adjusting apparatus and method of the present invention, the pH of a solution can be adjusted easily and accurately, regardless of a gas generated during electrolysis, a salt concentration in a sample, or a cytosolic salt concentration variation during cell lysis, by precisely controlling a constant current, a constant voltage, and current and voltage application times, thereby enabling useful application of the pH adjusting apparatus and method of the present invention in various biological assays such as cell lysis. Furthermore, the pH adjusting apparatus of the present invention is easy to carry due to small size and weight and can be operated for a long time after charging once due to low power consumption.

The pH adjusting apparatus of the present invention can adjust the pH of a solution easily and accurately using constant current electrolysis.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
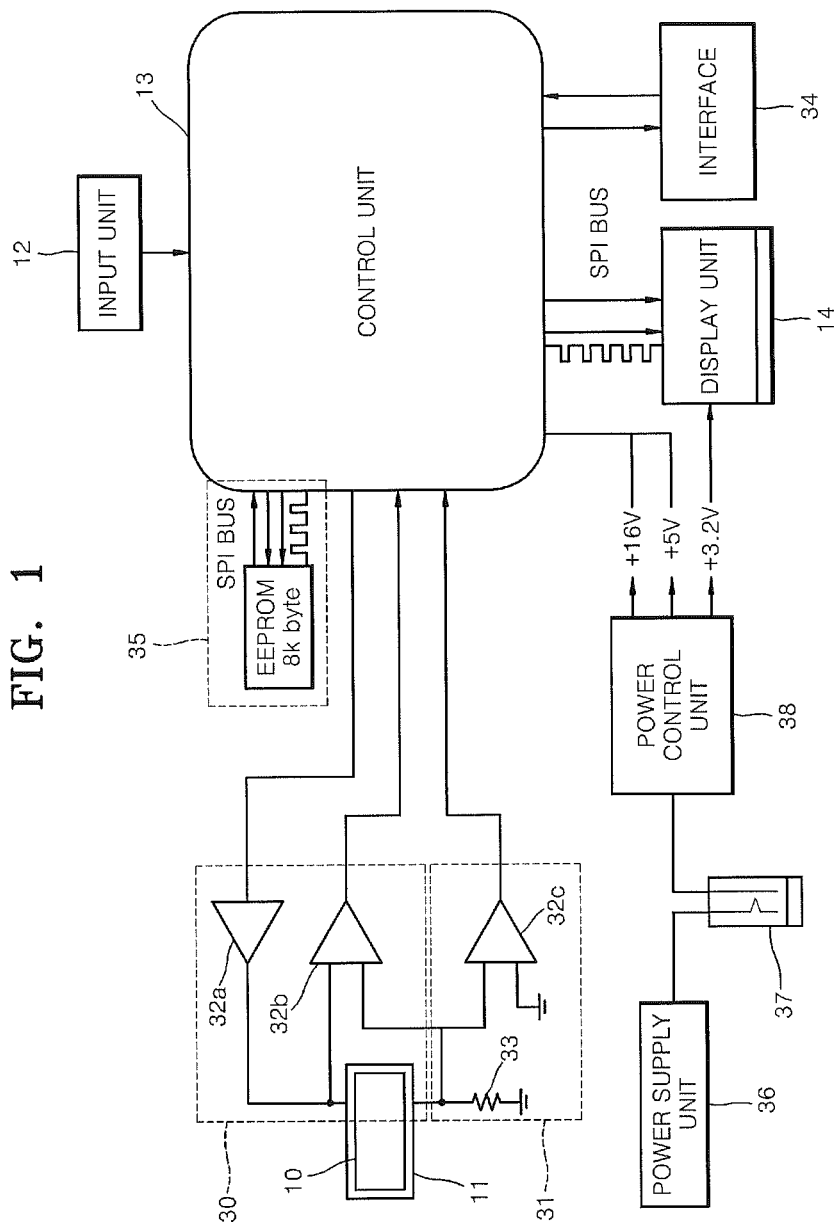
FIG. 1 is a schematic diagram illustrating an exemplary embodiment of a pH adjusting apparatus according to the present invention.

The present invention will now be described more fully with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings. The present invention provides a pH adjusting apparatus capable of adjusting the pH of a solution accurately and easily using constant current electrolysis.

FIG. 1 is a schematic diagram illustrating an exemplary embodiment of a pH adjusting apparatus according to the present invention.

Referring to FIG. 1, the pH adjusting apparatus includes an electrolytic chip 10 for receiving a solution whose pH is to be adjusted, an electrolytic chip loading station 11 for receiving the electrolytic chip 10, an input unit 12 for inputting electrolysis conditions, a control unit 13 for receiving the electrolysis conditions and controlling electrolysis performed in the electrolytic chip 10 according to the electrolysis conditions, and a display unit 14 for displaying the electrolysis conditions and the progress of the electrolysis.

As will be further described below, the electrolytic chip 10 may include a chamber for receiving the solution whose pH is to be adjusted, a cathode disposed at a side of the chamber, and an anode disposed at an opposite side of the chamber.

The electrolytic chip 10 may further include an ion-exchange material, and the ion-exchange material may divide the chamber into a cathode chamber including the cathode and an anode chamber including the anode.

In the exemplary embodiments of the present invention, the ion-exchange material allows the passage of a current, but blocks the passage of ions or gases generated by electrolysis in each of the cathode chamber and the anode chamber. Preferably, the ion-exchange material allows the passage of a current but blocks the passage of hydrogen ions and hydroxide ions. The ion-exchange material may be a cationic exchange film or an anionic exchange film.

Figure 2:
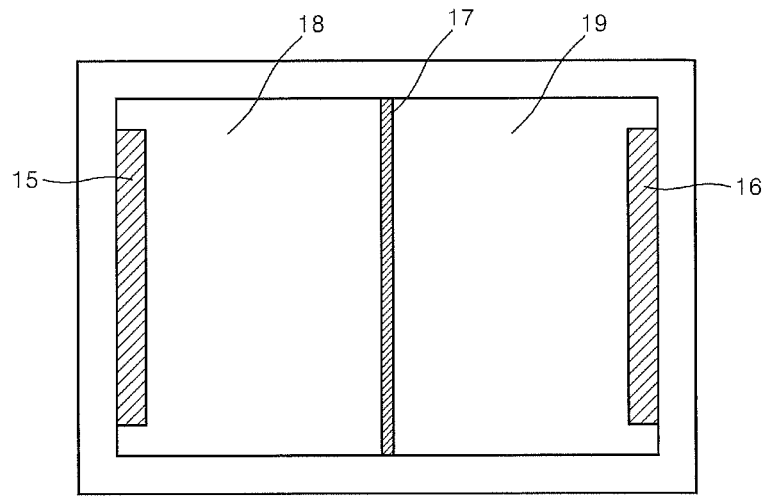
FIG. 2 is a sectional view illustrating an exemplary embodiment of an electrolytic chip of an exemplary pH adjusting apparatus according to the present invention.

FIG. 2 is a sectional view illustrating an exemplary embodiment of an electrolytic chip of an exemplary pH adjusting apparatus according to the present invention.

Referring to FIG. 2, the electrolytic chip, usable as the electrolytic chip 10 in FIG. 1, includes an ion-exchange membrane 17 and a chamber. The ion-exchange membrane 17 divides the chamber into two parts: a cathode chamber 18 including a cathode 15 and an anode chamber 19 including an anode 16. The cathode 15 is disposed on one side of the chamber, while the anode 16 is disposed on an opposite side of the chamber.

Figure 3A:
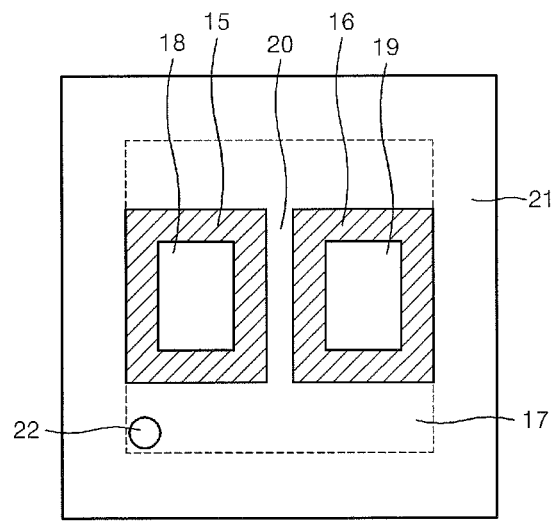
FIG. 3A is a transmitted, plan view illustrating another exemplary embodiment of an electrolytic chip of an exemplary pH adjusting apparatus according to the present invention.
Figure 3B:
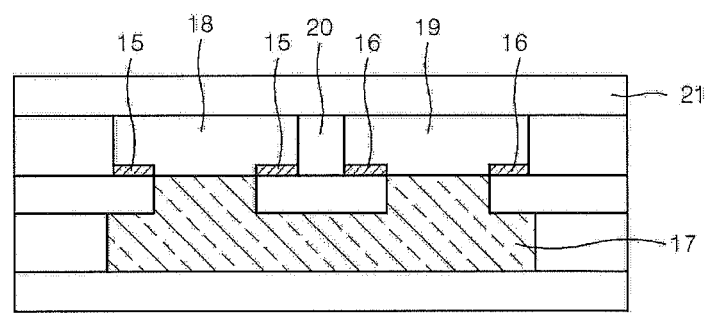
FIG. 3B is a sectional view of the exemplary electrolytic chip of FIG. 3A.
Figure 3C:
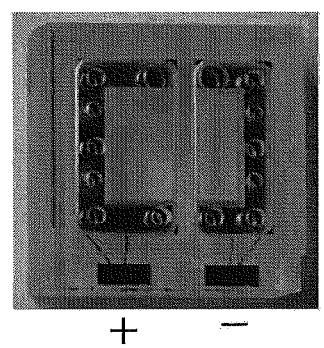
FIG. 3C is a top image of the exemplary electrolytic chip of FIG. 3A.

FIG. 3A is a transmitted, plan view illustrating another exemplary embodiment of an electrolytic chip of an exemplary pH adjusting apparatus according to the present invention, FIG. 3B is a sectional view of the exemplary electrolytic chip of FIG. 3A, and FIG. 3C is a top image of the exemplary electrolytic chip of FIG. 3A.

Referring to FIGS. 3A through 3C, the electrolytic chip, usable as the electrolytic chip 10 in FIG. 1, includes an ion-exchange material 17, a cathode chamber 18, a boundary of which is formed with a surface of the ion-exchange material 17, and wherein a cathode 15 is disposed in the cathode chamber 18 along edges of the boundary with the surface of the ion-exchange material 17, and an anode chamber 19, a boundary of which is formed with a surface of the ion-exchange material 17, and wherein an anode 16 is disposed in the anode chamber 19 along edges of the boundary with the surface of the ion-exchange material 17. The cathode chamber 18 and the anode chamber 19 are partitioned by a non-conductor 20. The cathode chamber 18 and the anode chamber 19 are surrounded by a substrate 21, and the substrate 21 may further include an ion-exchange material inlet 22.

The ion-exchange material 17 may have characteristics such that it can be used to form a film by cross-linking reaction. The use of such an ion-exchange material ensures easy fabrication of a micro-scale electrolytic chip.

More preferably, the ion-exchange material 17 may be a material disclosed in U.S. patent application Ser. No. 11/453,116, filed on Jun. 14, 2006 and entitled "Ion-Exchangeable Mixture and Method of Producing the Same", filed by the present applicant, the disclosure of which is incorporated herein in its entirety by reference.

Figure 4A:
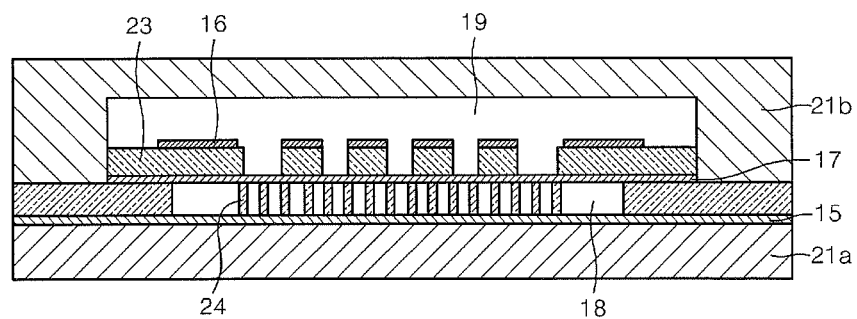
FIG. 4A is a sectional view illustrating still another exemplary embodiment of an electrolytic chip of an exemplary pH adjusting apparatus according to the present invention.
Figure 4B:
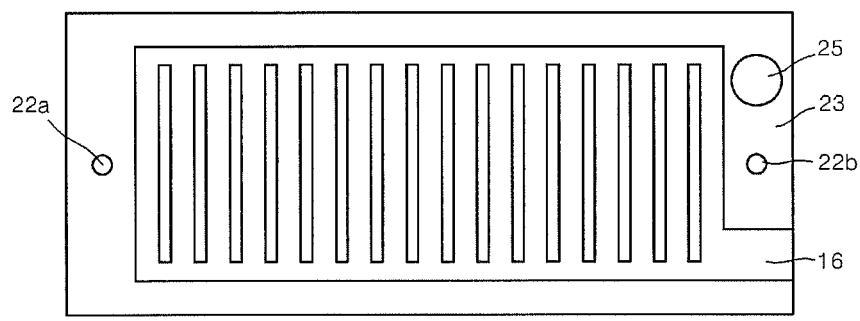
FIG. 4B is a plan view of the exemplary electrolytic chip of FIG. 4A.
Figure 4C:
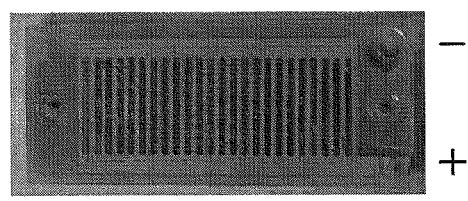
FIG. 4C is a top image of the exemplary electrolytic chip of FIG. 4A.

FIG. 4A is a sectional view illustrating still another exemplary embodiment of an electrolytic chip of an exemplary pH adjusting apparatus according to the present invention, FIG. 4B is a plan view of the exemplary electrolytic chip of FIG. 4A, and FIG. 4C is a top image of the exemplary electrolytic chip of FIG. 4A.

Referring to FIGS. 4A through 4C, the electrolytic chip, usable as the electrolytic chip 10 in FIG. 1, includes an ion-exchange membrane 17, an anode chamber 19, a boundary of which is formed with a surface of the ion-exchange membrane 17, including a ladder-shaped anode 16 and an anode support 23, and a cathode chamber 18, a boundary of which is formed with an opposite surface of the ion-exchange membrane 17, including a cathode 15. The elements of the electrolytic chip may be enclosed within first and second substrates 21a and 21b. The ladder-shaped anode 16 is disposed on a surface of the anode support 23, and the ion-exchange membrane 17 is disposed on the opposite surface of the anode support 23 to support the ion-exchange membrane 17. The anode support 23 has openings defined by the ladder shape of the anode 16. A pillar structure 24 is disposed at a surface of the cathode chamber 18 that is opposite to a surface of the cathode chamber 18 contacting with the ion-exchange membrane 17. The pillar structure 24 contacts with the ion-exchange membrane 17 to support the ion-exchange membrane 17. Thus, the anode support 23 contacts one side of the ion-exchange membrane 17, and the pillar structure 24 contacts an opposite side of the ion-exchange membrane 17. The pillar structure 24 facilitates the adsorption of biomolecules. The electrolyte chip may also include an inlet 22a and an outlet 22b of the cathode chamber 18, and a contact terminal connecting hole 25.

In the electrolytic chip shown in FIGS. 4A through 4C, the ion-exchange membrane 17 is supported by the anode support 23 and the pillar structure 24, thereby preventing the swelling of the ion-exchange membrane 17 and thus minimizing a volume change of the anode chamber 19 and the cathode chamber 18. Furthermore, uniform distribution of the ladder-shaped anode 16 facilitates a current flow, thereby ensuring efficient adjustment of pH.

In the electrolytic chip shown in FIGS. 4A through 4C, the cathode 15 may include a metal capable of adsorbing a hydrogen gas and the anode 16 may include a metal that has a higher standard oxidation potential than water and does not react with water to prevent the generation of gas bubbles in the anode chamber 19 and the cathode chamber 18. For example, the cathode 15 may be made of, for example, palladium (Pd), and the anode 16 may be made of a metal selected from a group including, for example, copper (Cu), lead (Pb), silver (Ag), chromium (Cr), titanium (Ti), nickel (Ni), zinc (Zn), iron (Fe), and tin (Sn).

FIGS. 5A through 5D are sectional views illustrating various exemplary embodiments of an electrolytic chip loading station of an exemplary pH adjusting apparatus according to the present invention.

Referring to FIGS. 5A through 5D, electrolytic chip loading stations 11, usable in the pH adjusting apparatus shown in FIG. 1, include an electrolytic chip support 26 for supporting an electrolytic chip 10, an electrode contact terminal 28 contacting with a cathode (not shown) and an anode (not shown) of the electrolytic chip 10 and including a spring pad 27, and a cover 29 for covering the electrolytic chip 10 loaded on the electrolytic chip support 26. For example, the electrolytic chip 10 may be any of the above-described exemplary embodiments of an electrolytic chip.

Figure 5A:
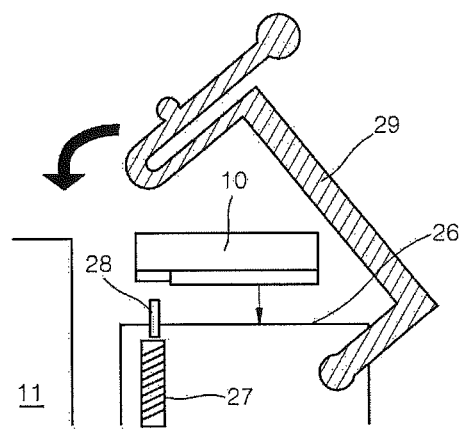
FIGS. 5A through 5D are sectional views illustrating various exemplary embodiments of an electrolytic chip loading station of an exemplary pH adjusting apparatus according to the present invention.
Figure 5B:
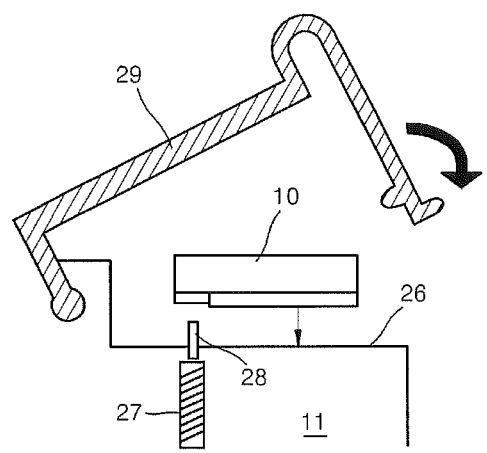

Referring to the electrolytic chip loading stations 11 shown in FIGS. 5A and 5B, the electrode contact terminal 28 is disposed on the electrolytic chip support 26, and the spring pad 27 is disposed within the electrolytic chip support 26. The electrolytic chip loading station 11 shown in FIG. 5A is different from that shown in FIG. 5B with respect to the position of a pivot shaft of the cover 29. That is, in FIG. 5A, the pivot shaft of the cover 29 is positioned on a side of the electrolytic chip support 26 opposite the electrode contact terminal 28, such that the electrolytic chip 10 is disposed between the pivot shaft and the electrode contact terminal 28 when the cover 29 is closed. In FIG. 5B, the pivot shaft of the cover 29 is positioned on a same side of the electrolytic chip support 26 as the electrode contact terminal 28, such that the electrolytic chip 10 is disposed between the electrode contact terminal 28 and a closing end of the cover 29 when the cover 29 is in a closed position.

Figure 5C:
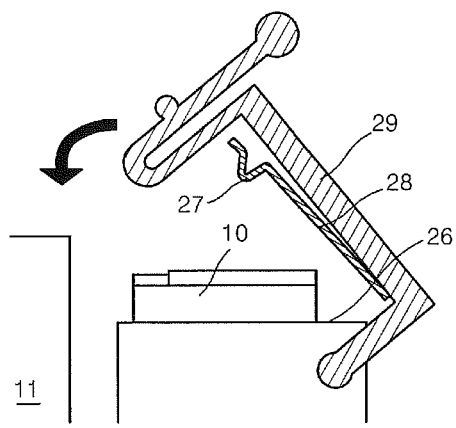
Figure 5D:
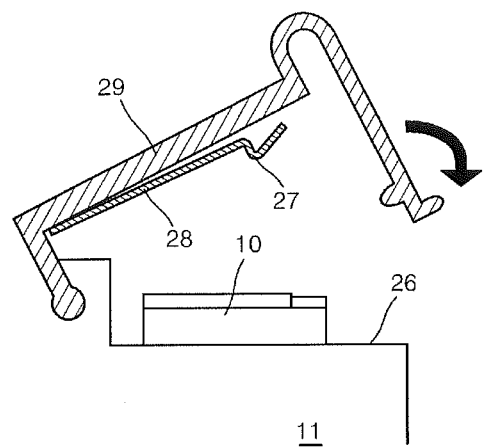

Referring to the electrolytic chip loading stations 11 shown in FIGS. 5C and 5D, the electrode contact terminal 28 and the spring pad 27 are disposed under the cover 29, such that the electrode contact terminal 28 is disposed between the cover 29 and the electrolytic chip 10 when the cover 29 is in a closed position. The electrolytic chip loading station 11 shown in FIG. 5C is different from that shown in FIG. 5D with respect to the position of a pivot shaft of the cover 29.

As described above, the use of a spring pad, such as spring pad 27, ensures a strong contact between electrodes of an electrolytic chip 10 and an electrode contact terminal 28 of an electrolytic chip loading station 11 and easy placement of the electrolytic chip 10 on the electrolytic chip loading station 11.

Figure 6A:
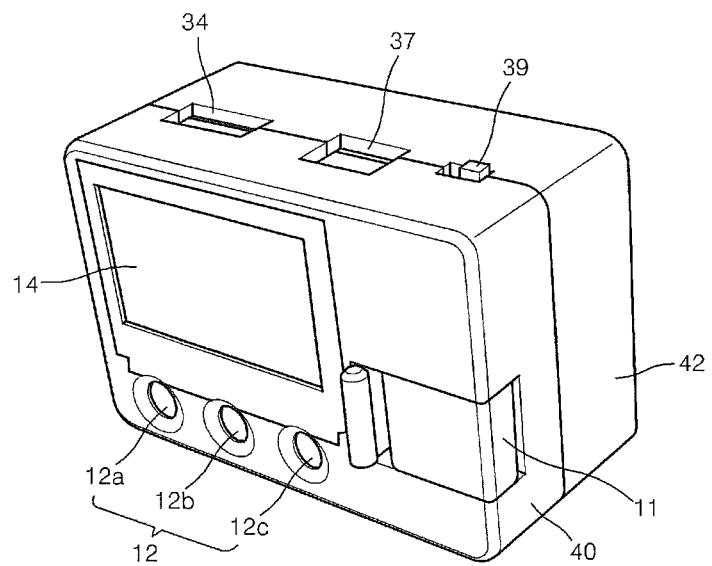
FIG. 6A is a perspective view illustrating an exemplary embodiment of a pH adjusting apparatus according to the present invention.
Figure 6B:
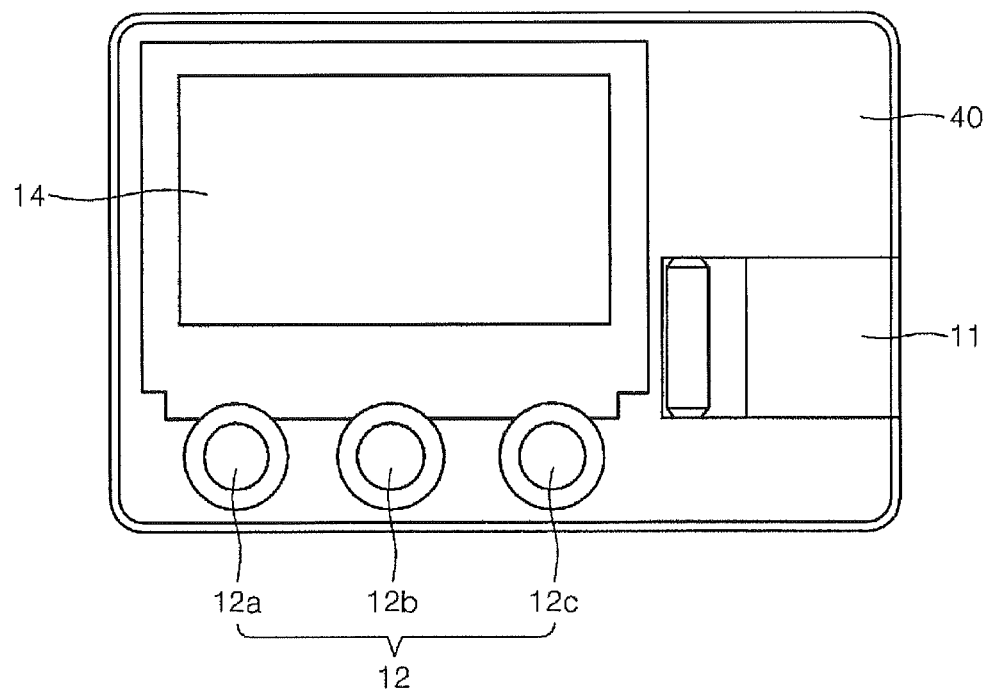
FIG. 6B is a front view of the exemplary pH adjusting apparatus of FIG. 6A.

Referring again to FIG. 1, according to an exemplary embodiment of the present invention, the input unit 12 for inputting electrolysis conditions, e.g., a current or voltage to be applied to the electrolytic chip 10, a current application time, or a voltage application time may include a plurality of buttons, e.g. such as shown in FIGS. 6A and 6B.

For example, the input unit 12 may include a "down" button, an "up" button, and a "menu/start" button. As the "menu/start" button is repeatedly pressed, the constant current setting menu, the constant voltage setting menu, the time setting menu, and the electrolysis start menu appear in sequence. In each menu, a user can select desired values by pressing the "down" button or the "up" button. While a three button system is described for the input unit 12, alternate input units 12 would also be within the scope of these embodiments.

The display unit 14 for displaying the conditions and progress of the electrolysis is not particularly limited, and may be a liquid crystal display ("LCD"). For example, the input unit 12 may be combined with the display unit 14 using a touch-screen display unit.

The control unit 13 receives the electrolysis conditions, such as inputted by the input unit 12, and controls electrolysis performed in the electrolytic chip 10. The control unit 13 can also control analog-to-digital conversion, analog output, memory, buttons, the display unit 14, inter-device communication, etc., in addition to electrolysis.

The pH adjusting apparatus of the present invention may further include a voltage measurement unit 30 for measuring a voltage applied to the electrolytic chip 10 and for transmitting the measured voltage to the control unit 13. For example, the voltage measurement unit 30 may include operational amplifiers ("OP-AMPs") 32a and 32b. The control unit 13 can apply a constant voltage to the electrolytic chip 10 based on the voltage measured by the voltage measurement unit 30.

The pH adjusting apparatus of the present invention may further include a current measurement unit 31 for measuring a current applied to the electrolytic chip 10 and transmitting the measured current to the control unit 13. For example, the current measurement unit 31 may include an OP-AMP 32c and a resistor 33. The control unit 13 can apply a constant current to the electrolytic chip 10 based on the current measured by the current measurement unit 31.

The pH adjusting apparatus of the present invention may further include an interface 34 that can be connected to a peripheral computer (not shown). For example, the interface 34 may be an RS232 serial port.

The pH adjusting apparatus of the present invention may further include a memory device 35 for storing information. For example, the information may include set values, conversion factors, etc., and the memory device 35 may be an electrically erasable programmable read-only memory ("EEPROM").

The pH adjusting apparatus of the present invention may further include a power supply unit 36. In an exemplary embodiment of the present invention, the power supply unit 36 may be a battery, e.g., a 3.6 V Li-ion battery, although alternate power supply units would also be within the scope of these embodiments.

The pH adjusting apparatus of the present invention may further include an adaptor port 37 that can be connected to an external power (not shown).

The applied power is not particularly limited but may be 3~12 V.

In an exemplary embodiment of the present invention, the pH adjusting apparatus of the present invention may further include a power control unit 38 for converting the applied power, from an external source via the adaptor port 37 or from the power supply unit 36, into different powers and supplying the different powers to the electrolytic chip 10, the control unit 13, and the display unit 14.

For example, the power control unit 38 can convert an applied power to predetermined voltages and then transmit a voltage of 16V to the electrolytic chip 10, a voltage of 5V to a printed circuit board ("PCB") including the control unit 13, and a voltage of 3.2 V to the display unit 14.

Figure 6C:
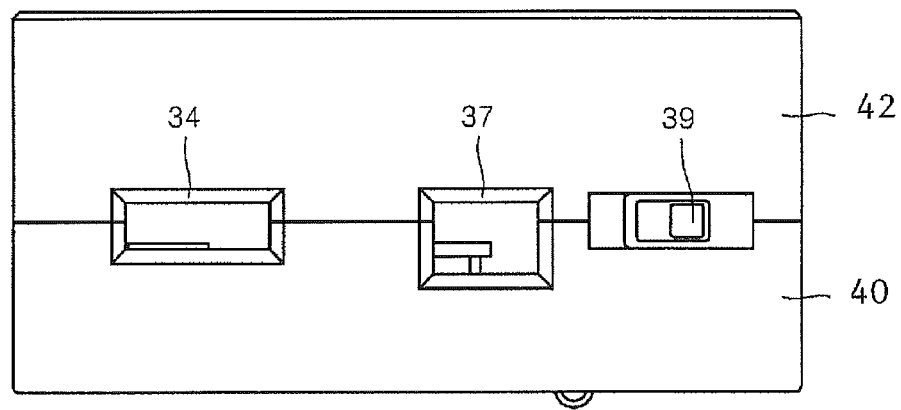
FIG. 6C is a top view of the exemplary pH adjusting apparatus of FIG. 6A.
Figure 6D:
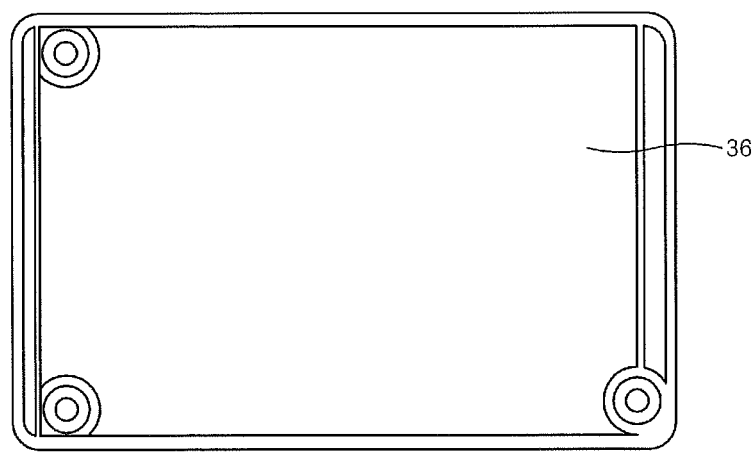
FIG. 6D is a rear view of the exemplary pH adjusting apparatus of FIG. 6A.
Figure 6E:
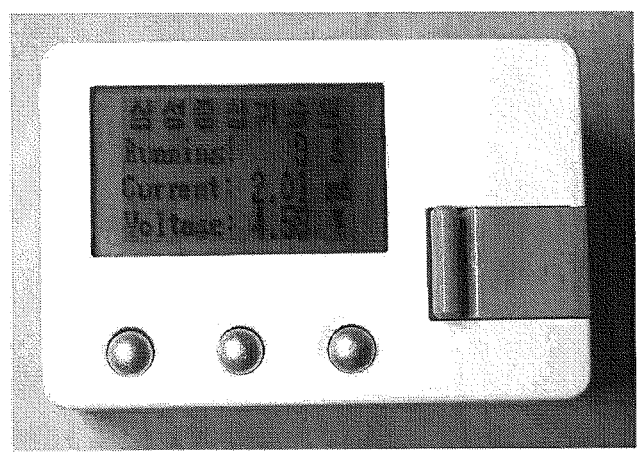
FIG. 6E is a front image of the exemplary pH adjusting apparatus of FIG. 6A.
Figure 6F:
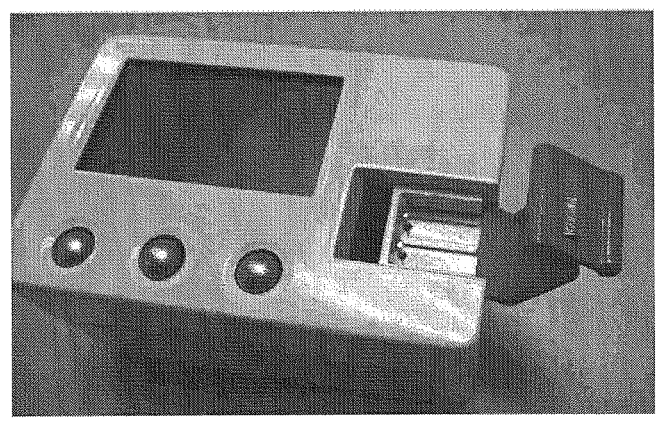
FIG. 6F is an image showing a state where an exemplary electrolytic chip loading station is uncovered.

FIG. 6A is a perspective view illustrating an exemplary embodiment of a pH adjusting apparatus according to the present invention, FIG. 6B is a front view of the exemplary pH adjusting apparatus of FIG. 6A, FIG. 6C is a top view of the exemplary pH adjusting apparatus of FIG. 6A, FIG. 6D is a rear view of the exemplary pH adjusting apparatus of FIG. 6A, FIG. 6E is a front image of the exemplary pH adjusting apparatus of FIG. 6A, and FIG. 6F is an image showing a state where an exemplary electrolytic chip loading station is uncovered.

Referring to FIGS. 6A through 6D, a pH adjusting apparatus of the present invention includes an LCD 14 used as a display unit, three input buttons 12a, 12b, and 12c for the input unit 12, and an electrolytic chip loading station 11 on a front surface thereof, an interface 34, an adaptor port 37, and an "on/off" switch 39 on a top surface thereof, and a battery 36 used as a power supply unit on a rear surface thereof. The pH adjusting apparatus also includes an upper case 40 and a lower case 42. While a particular arrangement of the elements visible on the exterior of the pH adjusting apparatus is illustrated, it should be understood that alternate arrangements of the elements of the pH adjusting apparatus would also be within the scope of these embodiments.

Referring to FIG. 6E, an LCD 14 displays, for example, an electrolysis running time, an applied current, and an applied voltage. Referring to FIG. 6F, an electrolytic chip loading station 11 is uncovered. Here, the electrolytic chip loading station 11 is as illustrated in FIG. 5A. The pH adjusting apparatus shown in FIGS. 6E and 6F was manufactured to have dimensions of 6 cm in width, 4 cm in length, and 3 cm in height, thus rendering portability to the pH adjusting apparatus, although the dimensions are not limited thereto. For example, the pH adjusting apparatus can be sized to fit and be carried by an average adult human hand.

Figure 7A:
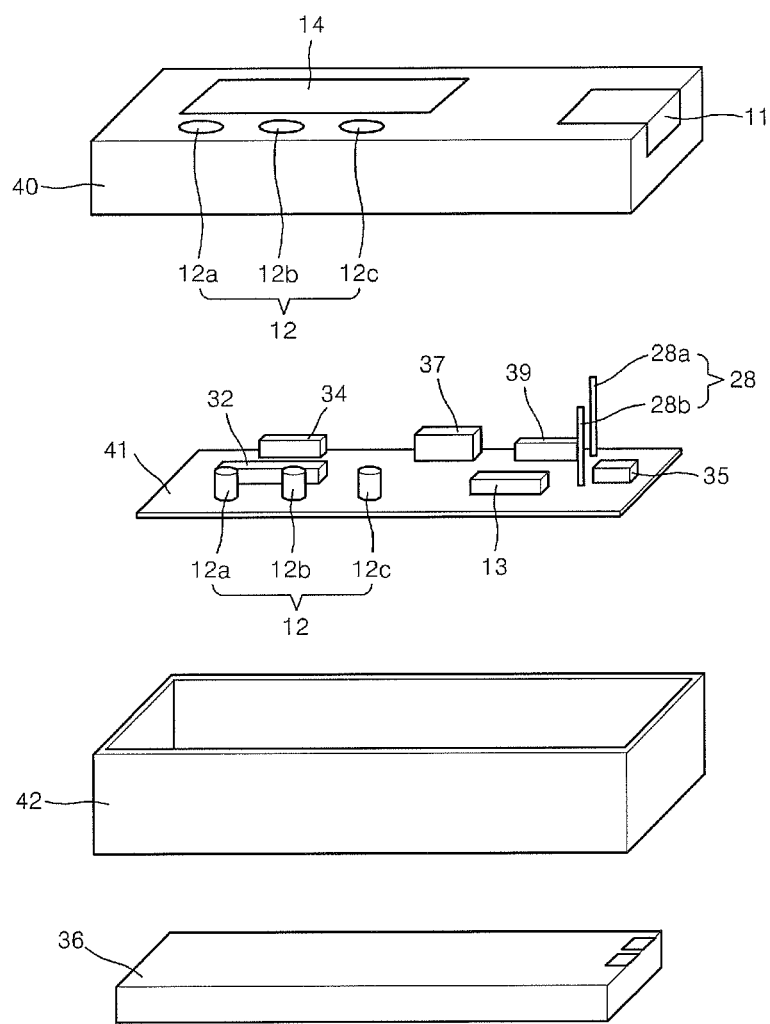
FIG. 7A is an exploded perspective view illustrating an exemplary embodiment of a pH adjusting apparatus according to the present invention.
Figure 7B:
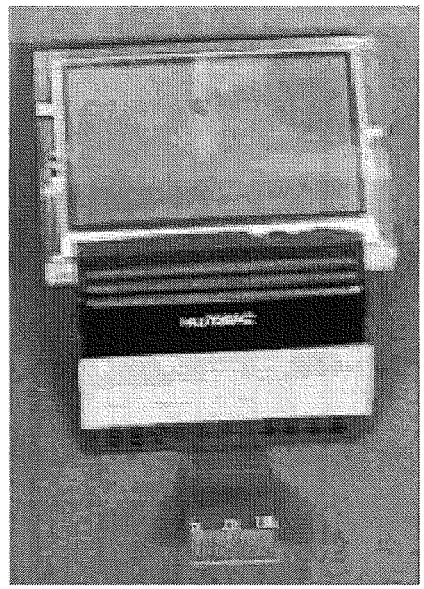
FIG. 7B is an image of an exemplary display unit of the exemplary pH adjusting apparatus of FIG. 7A.
Figure 7C:
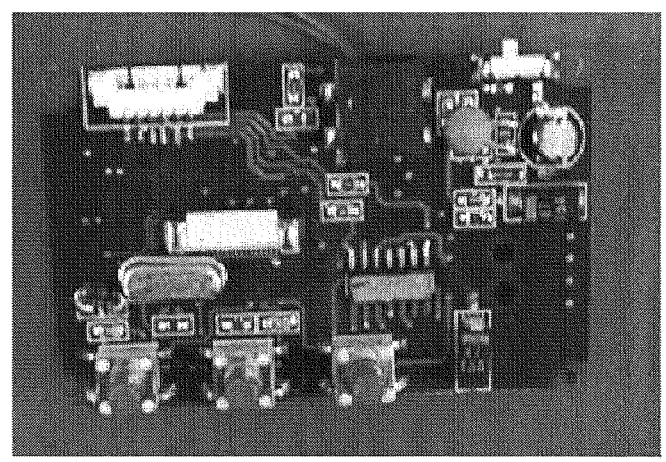
FIG. 7C is a front image of an exemplary printed circuit board ("PCB") of the exemplary pH adjusting apparatus of FIG. 7A.
Figure 7D:
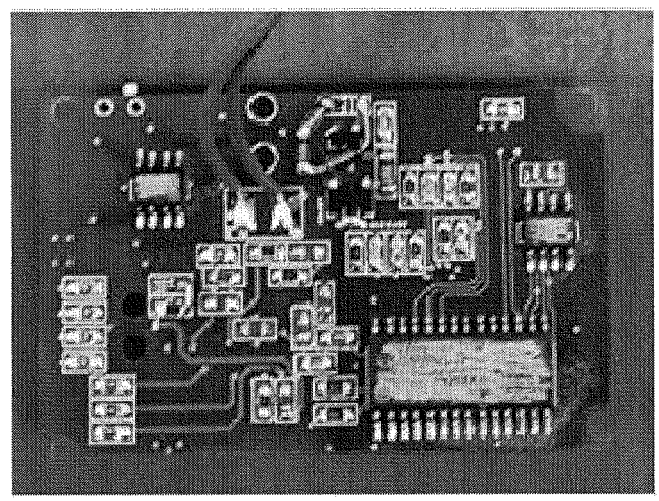
FIG. 7D is a rear image of the exemplary PCB of the exemplary pH adjusting apparatus of FIG. 7A.

FIG. 7A is an exploded perspective view illustrating an exemplary embodiment of a pH adjusting apparatus according to the present invention, FIG. 7B is an image of a display unit of the exemplary pH adjusting apparatus of FIG. 7A, FIG. 7C is a front image of an exemplary PCB of the exemplary pH adjusting apparatus of FIG. 7A, and FIG. 7D is a rear image of the exemplary PCB of the exemplary pH adjusting apparatus of FIG. 7A.

Referring to FIG. 7A, a PCB 41 is shown to include the control unit 13, and may further support the input unit 12, the electrode contact terminal 28, the OP-AMP 32, the interface 34, the memory device 35, the adaptor port 37, and the on-off switch 39 thereon, for electrically connecting the elements.

An exemplary embodiment of the PCB 41 is shown in detail in FIGS. 7C and 7D. The LCD 14, as further shown in FIG. 7B, may be positioned between the upper case 40 and the PCB 41. The upper case 40 may include an opening for exposing a display region of the LCD 14, and openings for accessing the buttons 12a, 12b, and 12c of the input unit 12. The upper case 40 may further include the electrolytic chip loading station 11 for receiving the electrolytic chip 10 therein. The PCB 41 may be positioned within the lower case 42 and may be electrically connected to battery disposed on a rear surface of the lower case 42. The upper case 40 and lower case 42 may be connected to each other to enclose the PCB 41 therein.

The present invention also provides an exemplary method of adjusting the pH of a solution in an easy and accurate manner using constant current electrolysis.

The pH adjusting method may include: (a) supplying a solution including an ion having a lower or higher standard oxidation potential than water into an anode chamber of an electrolytic chip and supplying a solution including an ion having a lower standard reduction potential than water into a cathode chamber of the electrolytic chip; (b) loading the electrolytic chip on an electrolytic chip loading station; (c) inputting electrolysis conditions using an input part of a pH adjusting apparatus; and (d) performing electrolysis in the anode chamber and the cathode chamber by passing a current through an anode and a cathode of the electrolytic chip according to the electrolysis conditions so that the solution supplied into the anode chamber or the solution supplied into the cathode chamber is adjusted to have a predetermined pH value.

In an embodiment of the present invention, for introduction into the anode chamber of the electrolytic chip, the ion having a lower standard oxidation potential than water may be at least one anion selected from $NO_3^-$, $F^-$, $SO_4^{2-}$, $PO_4^{3-}$, and $CO_3^{2-}$, and the ion having a higher standard oxidation potential than water may be an electrolyte including a $Cl^-$ ion. However, the present invention is not limited to these examples. In a case where the solution supplied into the anode chamber is a compound having a lower standard oxidation potential than water, electrolysis of water using a pH adjusting apparatus according to an embodiment of the present invention in the anode chamber produces an oxygen gas and a $H^+$ ion. At this time, the pH of the solution in the anode chamber is lowered due to the $H^+$ ion. Meanwhile, as described above, in a case where the anode is made of a metal that has a higher standard oxidation potential than water and does not react with water, no oxygen gas is generated due to the oxidation of the metal. The $Cl^-$ ion having a higher standard oxidation potential than water can be used only for the special purpose of cell lysis.

In an embodiment of the present invention, for introduction into the cathode chamber of the electrolytic chip, the ion having a lower standard reduction potential than water may be a cation such as $Na^+$, $K^+$, $Ca^{2+}$, $Mg^{2+}$, and $Al^{3+}$, but the present invention is not limited to these examples. Thus, electrolysis of water using a pH adjusting apparatus according to the present invention in the cathode chamber produces a hydrogen gas and an $OH^-$ ion. At this time, the pH of the solution in the cathode chamber is increased due to the $OH^-$ ion. Meanwhile, as described above, in a case where the cathode is made of a metal capable of adsorbing a hydrogen gas, the produced hydrogen gas is adsorbed by the cathode, thereby resulting in no generation of gas bubbles.

In an exemplary embodiment of the present invention, the solution supplied into the cathode chamber may include a cell or a virus, and cell or virus lysis may occur at the adjusted pH of the solution.

In another exemplary embodiment of the present invention, the solution supplied into the cathode chamber may be selected from a group including saliva, urine, blood, serum, and a cell culture.

In yet another exemplary embodiment of the present invention, the electrolysis conditions may include a current or voltage applied to the electrolytic chip, a current application time, or a voltage application time.

In still another exemplary embodiment of the present invention, the electrolysis conditions may include a constant current applied to the electrolytic chip and a constant current application time.

Figure 8A:
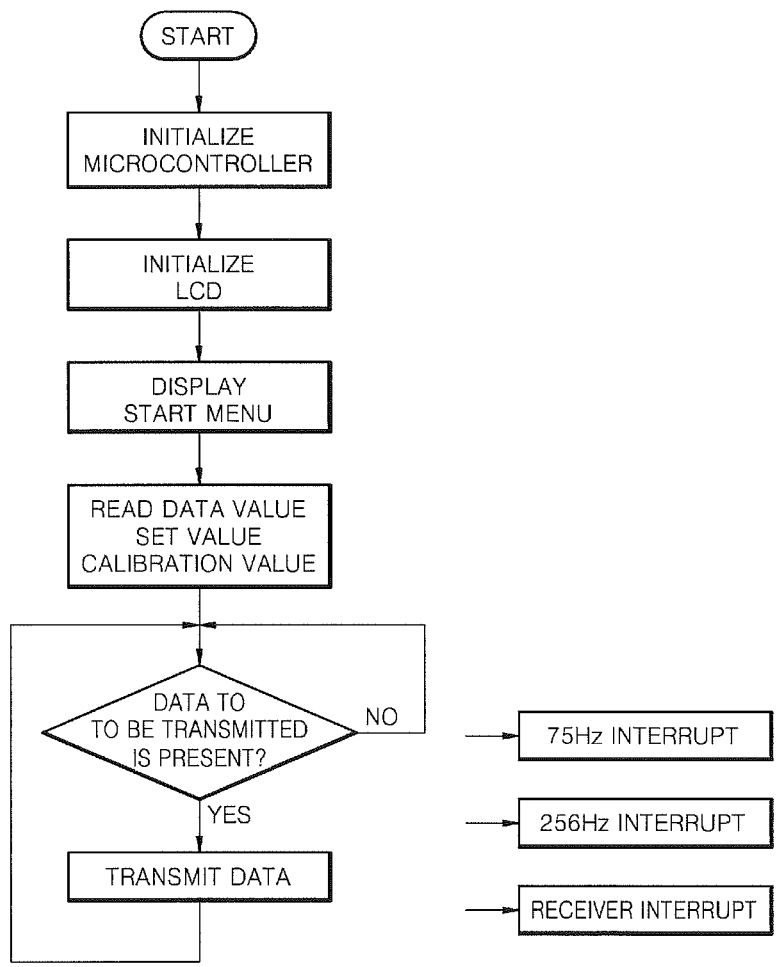
FIG. 8A is a flow diagram illustrating an exemplary embodiment of a program executed in an exemplary control unit of an exemplary pH adjusting apparatus according to the present invention.
Figure 8B:
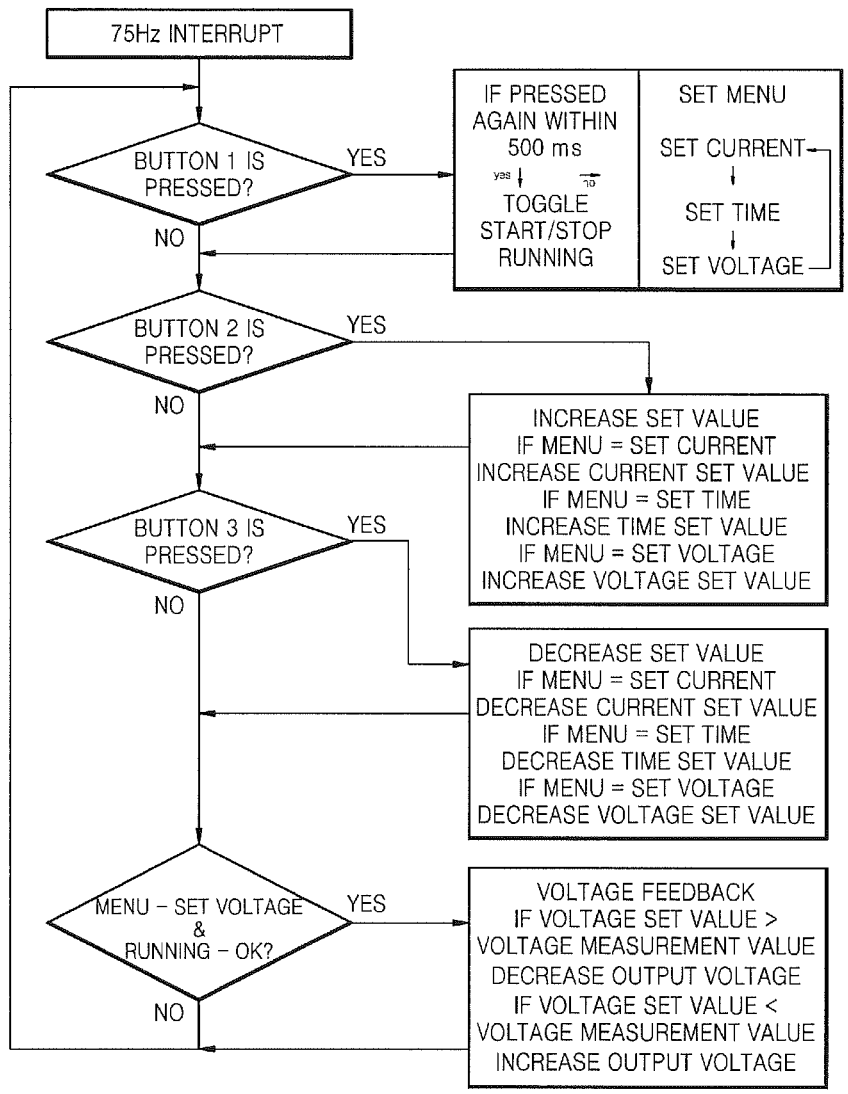
FIG. 8B is a flow diagram illustrating an exemplary embodiment of menu/voltage control.
Figure 8C:
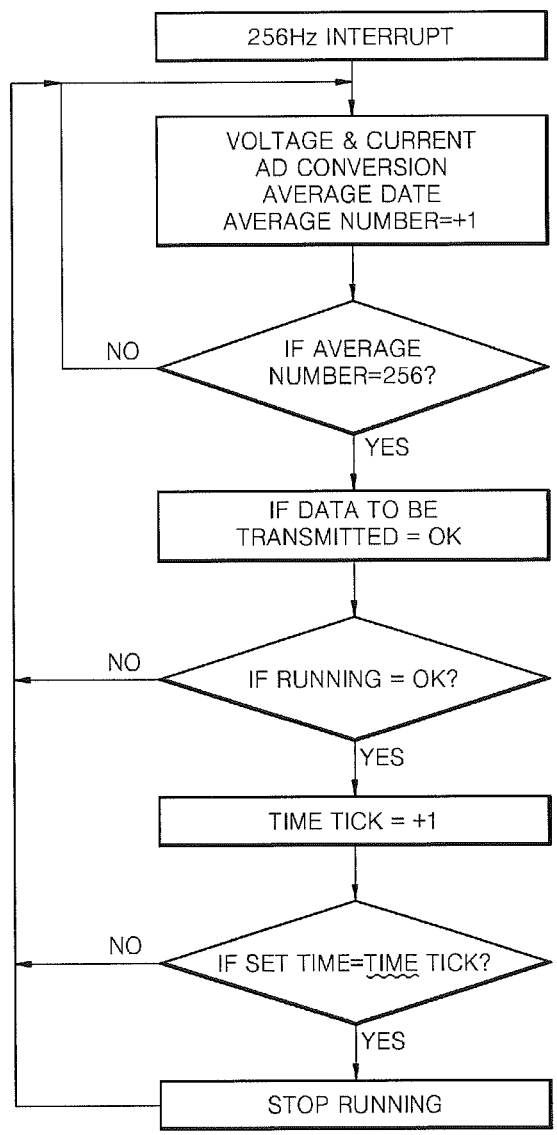
FIG. 8C is a flow diagram illustrating an exemplary embodiment of AD conversion/current control.
Figure 8D:
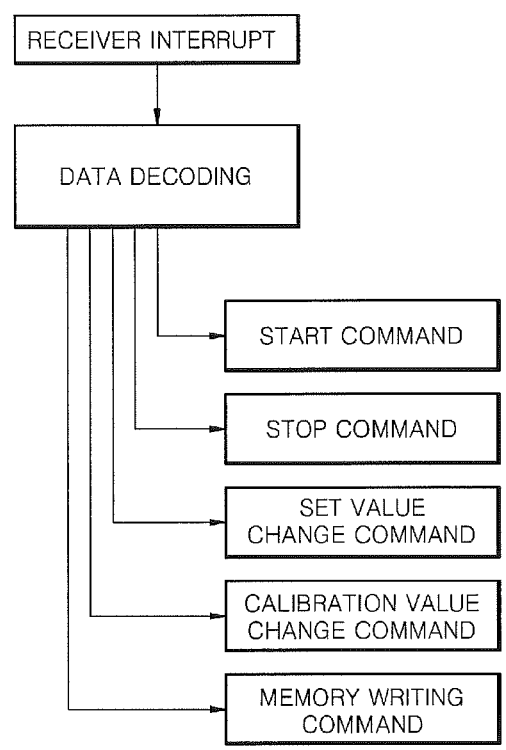
FIG. 8D is a flow diagram illustrating an exemplary embodiment of data communication with a peripheral computer via an interface.

FIG. 8A is a flow diagram illustrating an exemplary embodiment of a program executed in an exemplary control unit of an exemplary pH adjusting apparatus according to the present invention, FIG. 8B is a flow diagram illustrating an exemplary embodiment of menu/voltage control, FIG. 8C is a flow diagram illustrating an exemplary embodiment of AD conversion/current control, and FIG. 8D is a flow diagram illustrating an exemplary embodiment of data communication with a peripheral computer via an interface.

Referring to FIG. 8A, when the control unit 13 is initialized, such as by turning the unit on using the on-off switch 39, the LCD 14 is initialized and displays a start menu. Then, data values are read and then set and calibrated. At this time, at least one of three interrupts may occur. A 75 Hz interrupt may initiate the menu/voltage control as shown in FIG. 8B. A 256 Hz interrupt may initiate the AD conversion/current control as shown in FIG. 8C. A receiver interrupt may initiate the data communication with a peripheral computer via an interface as shown in FIG. 8D.

Referring to FIG. 8B, together with FIGS. 6A through 6F illustrating a pH adjusting apparatus including an input unit 12 having three buttons, as a button 1, such as button 12A, is repeatedly pressed, the current setting menu, the time setting menu, and the voltage setting menu appear in sequence. In each menu, when a button 2 ("up" button), such as button 12B, or a button 3 ("down" button), such as button 12C, is pressed, a current, a time, and a voltage can be adjusted to desired values. In particular, a set value (such as current, time, or voltage) can be increased by pressing the button 2, and the set value can be decreased by pressing the button 3.

For example, the button 1 can be pressed three times to display the voltage setting menu, the voltage can be adjusted to a desired value using the button 2 or 3, such as by increasing a set voltage if the button 2 is pressed or decreasing a set voltage if the button 3 is pressed, and then the button 1 can be pressed again to start electrolysis. Therefore, a constant voltage can be applied to an electrolytic chip by a voltage measurement unit and a control unit to perform electrolysis.

Referring to FIG. 8C, together with FIG. 8B, the button 1 is pressed once to set the constant current, the button 1 is pressed again to set the electrolysis time, and the button 1 is pressed again to start electrolysis. At this time, a current measurement unit, such as current measurement unit 31 shown in FIG. 1, and a control unit 13 according to the present invention constantly maintain the current applied to an electrolytic chip. Because the current measurement unit 31 measures a current applied to the electrolytic chip 10 and transmits the measured current to the control unit 13, the control unit 13 can then apply a constant current to the electrolytic chip 10 based on the current measured by the current measurement unit 31. Thus, a continuous loop is followed, and the AD conversion and current control shown in FIG. 8C continues until a set time is reached, such as when the electrolysis procedure is programmed to stop.

Current is the most important factor in pH adjustment using electrolysis. The pH adjusting apparatus according to exemplary embodiments of the present invention can accurately control current, in particular a constant current, and thus, the pH of a solution can be adjusted easily and accurately.

Referring to FIG. 8D, a receiver interrupt may initiate data communication with a peripheral computer via an interface, such as interface 34. For example, the data decoding may result in a start command, a stop command, a set value change command, a calibration value change command, a memory writing command, etc. That is, the peripheral computer may serve as an input unit for the control unit 13, and may further direct operations of the control unit 13.

According to the pH adjusting apparatus and method of the present invention, the pH of a solution can be adjusted easily and accurately, regardless of a gas generated during electrolysis, a salt concentration in a sample, or a cytosolic salt concentration variation during cell lysis, by precisely controlling a constant current, a constant voltage, and current and voltage application times, in particular the constant current, thereby enabling useful application of the pH adjusting apparatus and method of the present invention in various biological assays such as cell lysis. Furthermore, the pH adjusting apparatus of the present invention is easy to carry due to small size and weight and can be operated for a long time after charging once due to low power consumption (e.g., working time of about 7 hours based on 3.7V battery and 650 mAh).

Hereinafter, the present invention will be described more specifically with reference to the following working examples. The following working examples are for illustrative purposes and are not intended to limit the scope of the invention.

EXAMPLE pH Adjustment Experiments Using Exemplary Embodiment of pH Adjusting Apparatus According to the Present Invention A pH adjusting apparatus as shown in FIGS. 6A through 6F was used and the pH adjusting capability of the apparatus was evaluated.

For this, 10 µl of a 55 mM $Na_2SO_4$ solution was supplied into each of a cathode chamber and an anode chamber of an electrolytic chip, and the electrolytic chip was loaded on an electrolytic chip loading station. Then, electrolysis was performed by varying the settings of a constant current and a current running time, and the pH of the solution in each of the cathode chamber and the anode chamber was measured.

The results are presented in Table 1 below. As shown in Table 1, it can be seen that the use of a pH adjusting apparatus of the present invention enables easy and accurate adjustment of the pH of a solution.

TABLE 1

| | 1 mA | | 2 mA | | 3 mA | | 4 mA | |
|---|---|---|---|---|---|---|---|---|
| Time (sec) | Anode chamber | Cathode chamber | Anode chamber | Cathode chamber | Anode chamber | Cathode chamber | Anode chamber | Cathode chamber |
| 3 | 2 | 12 | 1 | 13 | 1 | 13 | 0 | 14 |
| 6 | 1 | 13 | 1 | 13 | 0 | 14 | 0 | 14 |
| 9 | 1 | 13 | 0 | 14 | 0 | 14 | 0 | 14 |

TABLE 1-continued

| | 1 mA | | 2 mA | | 3 mA | | 4 mA | |
|---|---|---|---|---|---|---|---|---|
| Time (sec) | Anode chamber | Cathode chamber | Anode chamber | Cathode chamber | Anode chamber | Cathode chamber | Anode chamber | Cathode chamber |
| 12 | 1 | 13 | 0 | 14 | 0 | 14 | 0 | 14 |
| 15 | 0 | 14 | 0 | 14 | 0 | 14 | 0 | 14 |

While the present invention has been particularly shown and described with reference to exemplary embodiments thereof, it will be understood by those of ordinary skill in the art that various changes in form and details may be made therein without departing from the essential features of the present invention. Thus, the embodiments of the present invention described above are to be deemed in all respects as being merely illustrative and not restrictive. The scope of the present invention is defined by the appended claims, not the above description, and it should be understood that all the equivalents fall within the scope of the appended claims.

What is claimed is:

1. A method of adjusting a pH of a solution using a pH adjusting apparatus, the pH adjusting apparatus including an electrolytic chip which receives a solution whose pH is to be adjusted, the method comprising:
   (a) supplying a solution comprising an ion having a lower or higher standard oxidation potential than water into an anode chamber of the electrolytic chip and supplying a solution comprising an ion having a lower standard reduction potential than water into a cathode chamber of the electrolytic chip;
   (b) loading the electrolytic chip on an electrolytic chip loading station;
   (c) inputting electrolysis conditions; and
   (d) performing electrolysis in the anode chamber and the cathode chamber by passing a current through an anode and a cathode of the electrolytic chip according to the electrolysis conditions so that the solution supplied into the anode chamber or the solution supplied into the cathode chamber is adjusted to have an adjusted pH at a predetermined pH value,
   the pH adjusting apparatus comprising:
      the electrolytic chip comprising:
         an enclosed chamber including the cathode at a side of the chamber and the anode at an opposite side of the chamber, and in which the pH of the solution is adjusted;
         an ion-exchange material which divides the chamber into the cathode chamber including the cathode and the anode chamber including the anode; and
         an anode support between the anode and the ion-exchange material;
      the electrolytic chip loading station which receives the electrolytic chip,
      an input unit that inputs the electrolysis conditions,
      a control unit which receives the electrolysis conditions and controls the electrolysis in the electrolytic chip,
      a current measurement unit which measures the current applied to the electrolytic chip and transmits the measured current to the control unit, wherein the control unit applies a constant current to the chamber of the electrolytic chip based on the current measured by the current measurement unit; and
      a display unit that displays the electrolysis conditions and a progress of the electrolysis.

2. The method of claim 1, wherein supplying a solution into the cathode chamber comprises supplying a cell or a virus, and cell or virus lysis occurs at the adjusted pH of the solution.

3. The method of claim 1, wherein supplying a solution into the cathode chamber comprises supplying one of saliva, urine, blood, serum, and a cell culture.

4. The method of claim 1, wherein inputting the electrolysis conditions includes inputting a current applied to the electrolytic chip, a voltage applied to the electrolytic chip, a current application time, or a voltage application time.

5. The method of claim 4, wherein inputting the electrolysis conditions includes inputting a constant current applied to the electrolytic chip and a constant current application time.

* * * * *